United States Patent
Gibson

(10) Patent No.: US 9,832,136 B1
(45) Date of Patent: Nov. 28, 2017

(54) STREAMING SOFTWARE TO MULTIPLE VIRTUAL MACHINES IN DIFFERENT SUBNETS

(71) Applicant: Liberty Mutual Insurance Company, Boston, MA (US)

(72) Inventor: Tucker Charles Gibson, Boston, MA (US)

(73) Assignee: Liberty Mutual Insurance Company, Boston, MA (US)

( * ) Notice: Subject to any disclaimer, the term of this patent is extended or adjusted under 35 U.S.C. 154(b) by 521 days.

(21) Appl. No.: 14/162,586

(22) Filed: Jan. 23, 2014

Related U.S. Application Data

(60) Provisional application No. 61/755,906, filed on Jan. 23, 2013.

(51) Int. Cl.
*G06F 9/455* (2006.01)
*H04L 12/911* (2013.01)
*G06F 9/44* (2006.01)

(52) U.S. Cl.
CPC ............ *H04L 47/70* (2013.01); *G06F 9/4416* (2013.01); *G06F 9/45533* (2013.01)

(58) Field of Classification Search
CPC .............. G06F 9/4416; G06F 9/45533; G06F 17/30073; G06F 17/30864; H04L 47/70; H04L 63/02; H04L 63/302; H04L 9/3236; H04N 5/23241; H04N 5/76; H04W 16/26; H04W 24/02
See application file for complete search history.

(56) References Cited

U.S. PATENT DOCUMENTS

| | | | |
|---|---|---|---|
| 2006/0089992 A1* | 4/2006 | Blaho | G06F 3/1431 709/227 |
| 2007/0140242 A1 | 6/2007 | DiGiorgio | |
| 2008/0089338 A1* | 4/2008 | Campbell | H04L 12/24 370/392 |
| 2009/0193413 A1* | 7/2009 | Lee | G06F 9/4416 718/1 |
| 2010/0257263 A1 | 10/2010 | Casado | |
| 2010/0302940 A1 | 12/2010 | Patel | |
| 2010/0322255 A1 | 12/2010 | Hao | |

(Continued)

FOREIGN PATENT DOCUMENTS

JP  2011-186805 A  9/2011

OTHER PUBLICATIONS

Brian Madden, "Where does OS Streaming Make Sense?", Jul. 28, 2010, techtarget.com, pp. 1-2. Found at: http://searchvirtualdesktop.techtarget.com/news/1517392/Where-does-OS-streaming-make-sense.*

*Primary Examiner* — Thomas Lee
*Assistant Examiner* — Chad Erdman
(74) *Attorney, Agent, or Firm* — Christensen O'Connor Johnson Kindness PLLC

(57) ABSTRACT

A provisioning server delivers operating systems to more than one virtual machine in different subnetworks. Since one provisioning server can be used for multiple subnetworks, this reduces the need to build, license, and support a provisioning server or a provisioning server farm for each subnetwork. This eliminates additional Infrastructure Software licensing; reduces additional effort to implement and maintain more provisioning servers; increases flexibility to add additional subnetworks; and scales a provisioning server farm to meet demand by adding servers.

20 Claims, 7 Drawing Sheets

(56) References Cited

U.S. PATENT DOCUMENTS

| | | | |
|---|---|---|---|
| 2012/0030456 A1* | 2/2012 | Wu | H04L 67/025 |
| | | | 713/2 |
| 2012/0266213 A1* | 10/2012 | Spiers | H04L 63/0218 |
| | | | 726/3 |
| 2012/0278802 A1* | 11/2012 | Nilakantan | G06F 9/45558 |
| | | | 718/1 |
| 2013/0019016 A1* | 1/2013 | Anderson | G06F 9/5077 |
| | | | 709/226 |

* cited by examiner

STREAMING SOFTWARE TO MULTIPLE VIRTUAL MACHINES IN DIFFERENT SUBNETS

CROSS-REFERENCE TO RELATED APPLICATION

This application claims the benefit of Provisional Application No. 61/755,906, filed Jan. 23, 2013, which is incorporated herein by reference.

TECHNICAL FIELD

The present subject matter is generally related to networking, and more particularly, it relates to streaming multiple pieces of software, such as operating systems, over a network to virtual machines in different subnetworks.

BACKGROUND

Provisioning services provide the ability to stream an operating system over a network to a virtual machine. Network administrators use provisioning services to manage one single operating system image in Virtual Hard Disk (VHD) format on a single host computing machine to stream to many virtual machines. Provisioning servers are conventionally configured with either one or two network interfaces, which are systems of software/hardware interfacing between two pieces of equipment in a network. If the provisioning server is setup with only one network interface, it is used for both management communication (Active Directory, database, and so on) and streaming (providing operating systems to virtual machines). If the provisioning server is setup with two network interfaces, one is dedicated for management traffic and the other for streaming traffic. It is conventional practice to have a network adapter used for streaming on a network subnetwork used for the virtual machines and not streaming through a firewall or over a network switch. As a result, this practice limits the ability of network administrators, who must support more than one subnetwork to building additional provisioning servers for each additional subnetwork.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One aspect of the subject matter includes a system form which recites a system comprising a TFTP server; a provisioning server or a provisioning server farm; multiple virtual machines running on standard build units networked to the provisioning server or the provisioning server farm; and multiple virtual local area network subnetworks networking the multiple virtual machines running on the standard build units to the TFTP server.

Another aspect of the subject matter includes a method form which recites a method comprising the following steps. One step includes receiving by a virtual machine a boot file from a TFTP server on a subnetwork. Another step includes identifying an IP address of a provisioning server farm. An additional step includes making a pre-execution environment request to the provisioning server farm on a network different from the subnetwork that directly couples the virtual machine to the provisioning server farm. A further step includes streaming an operating system image to the virtual machine by the provisioning server farm on the network different from the subnetwork that directly couples the virtual machine to the provisioning server farm, after which the virtual machine completes an operating system boot process.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
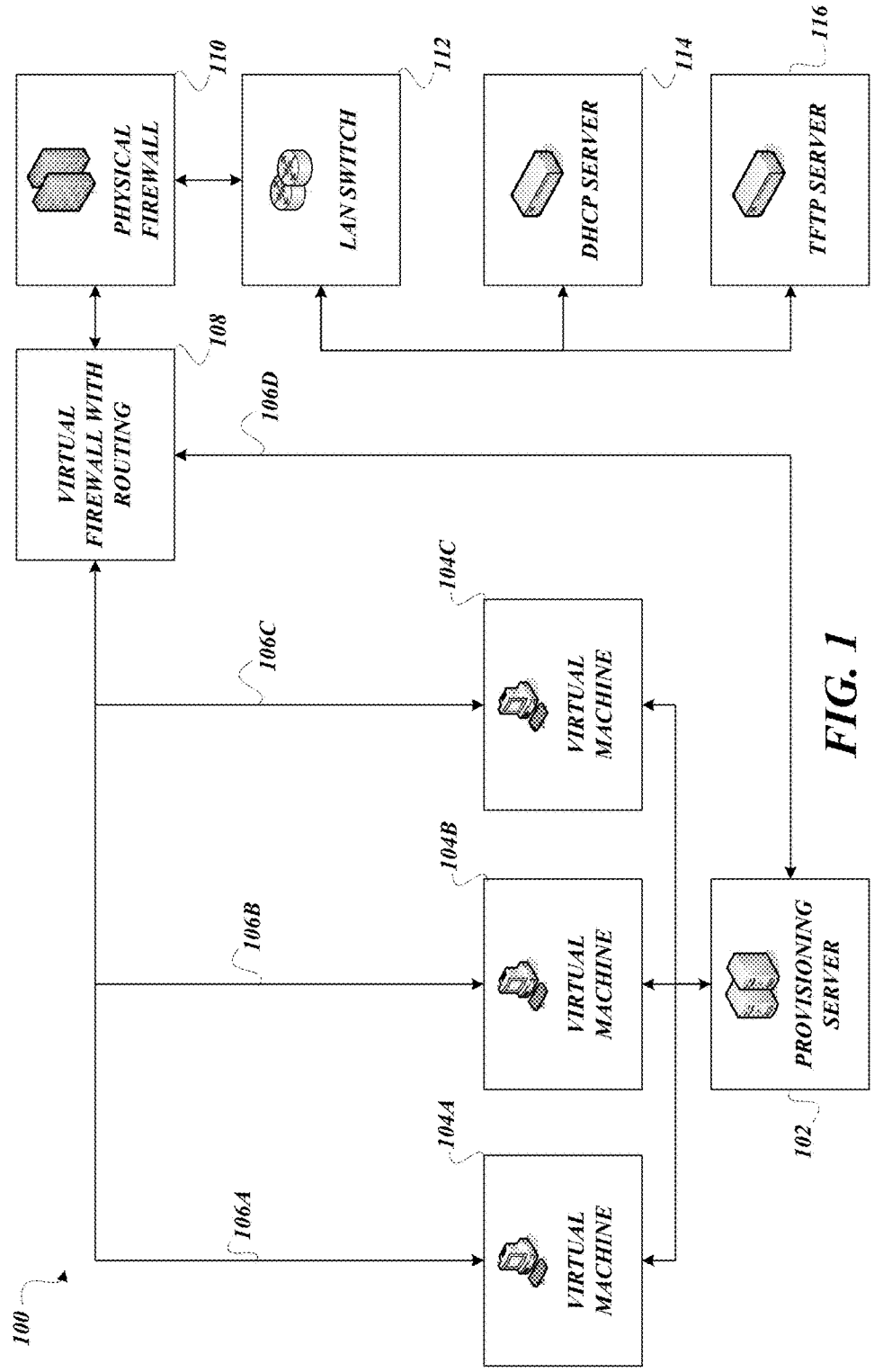
FIG. 1 is a block diagram illustrating an archetypical system which is suitable for providing provisioning services.
Figure 2A:
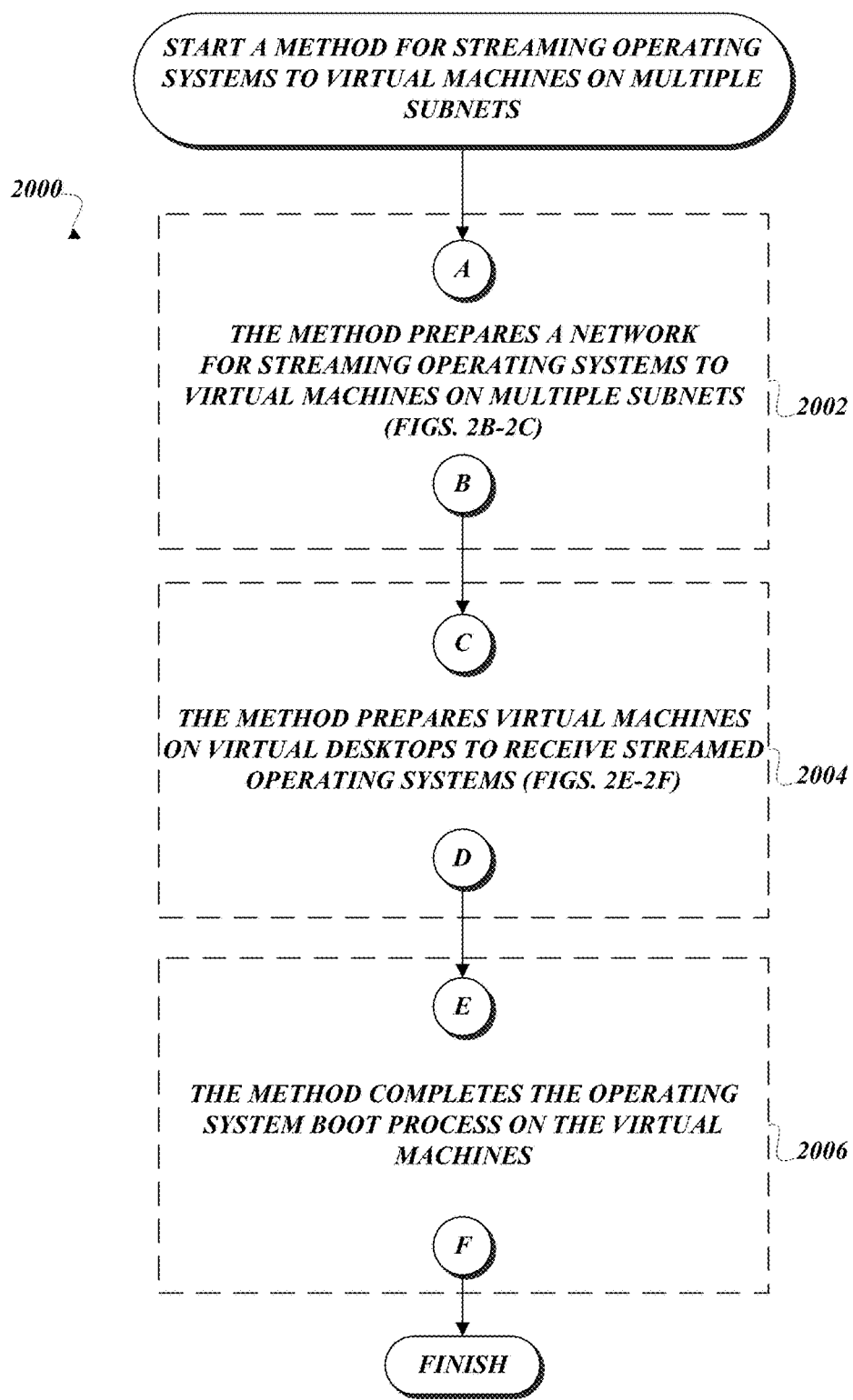
FIGS. 2A-2F are process diagrams illustrating an archetypical method for streaming operating systems to different virtual machines on multiple subnetworks.
Figure 2B:
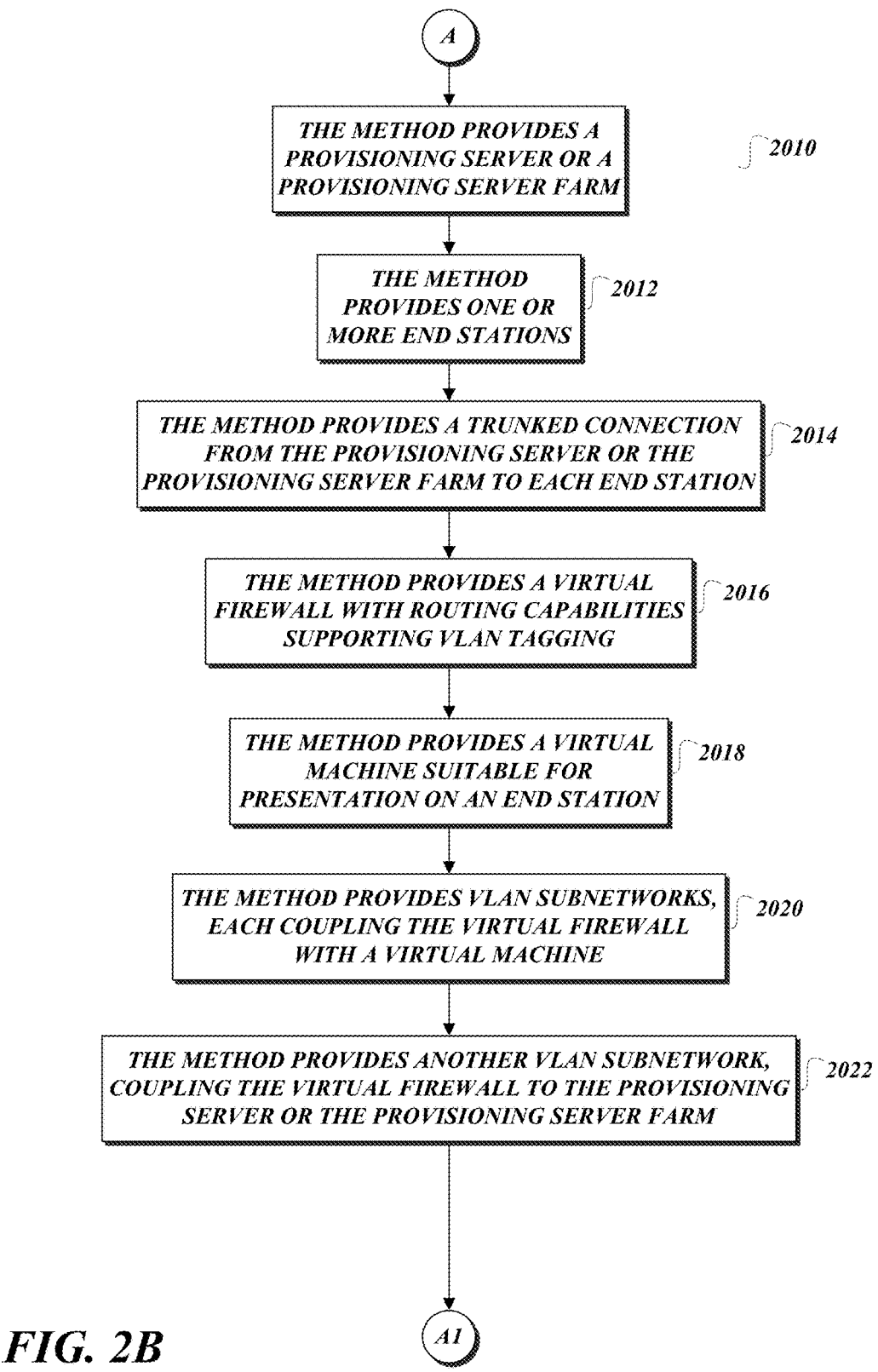
Figure 2C:
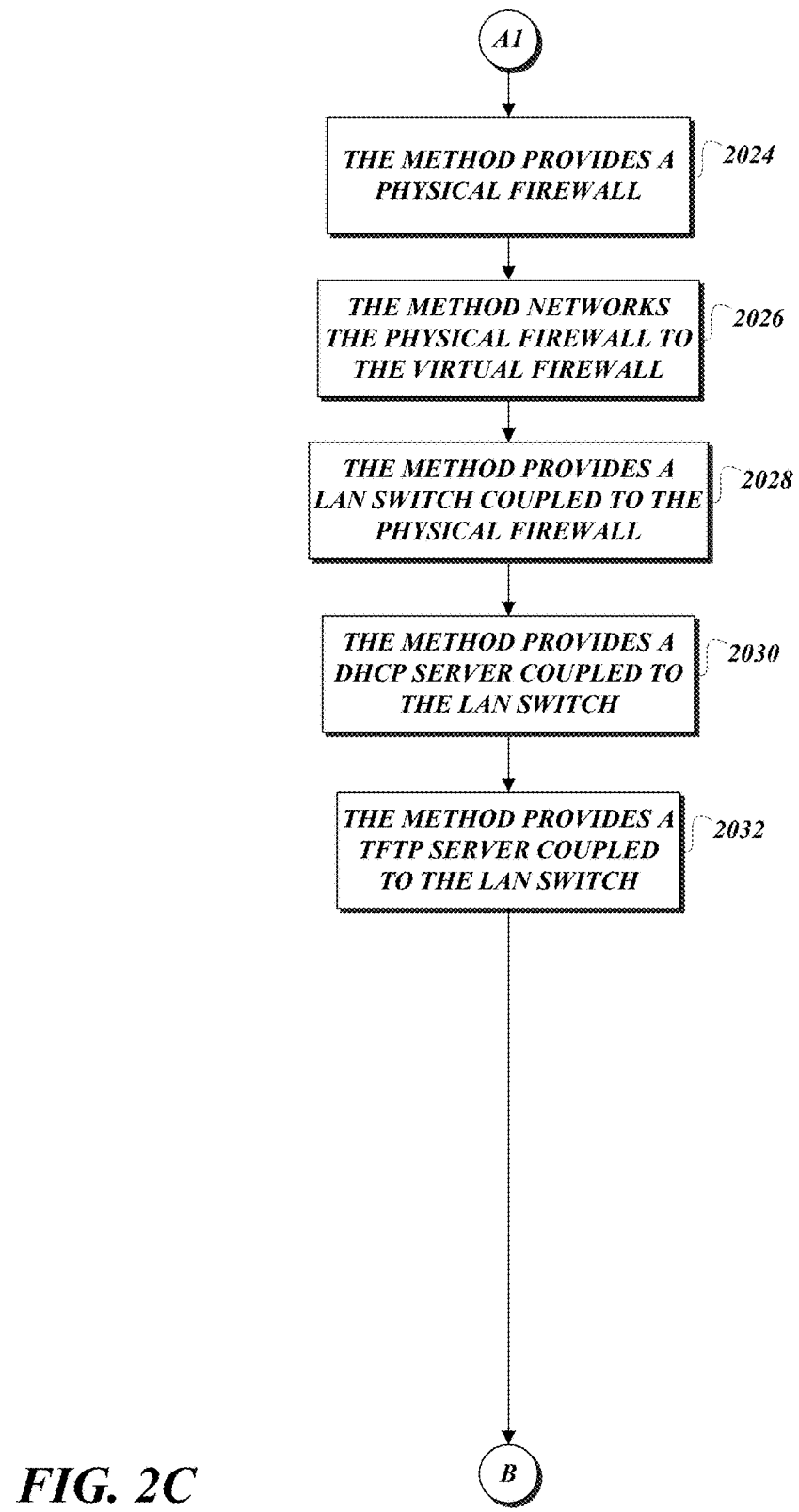
Figure 2D:
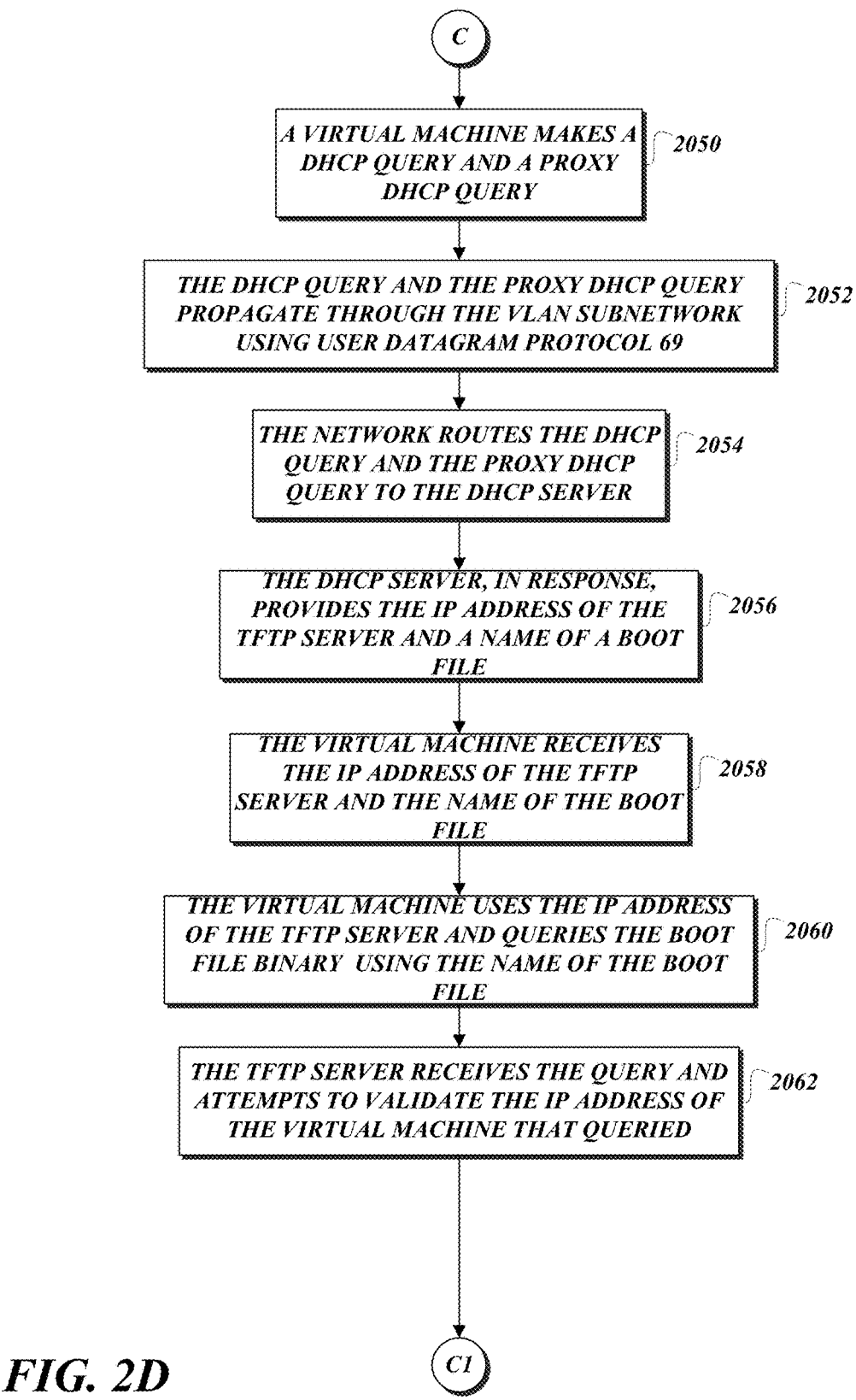
Figure 2E:
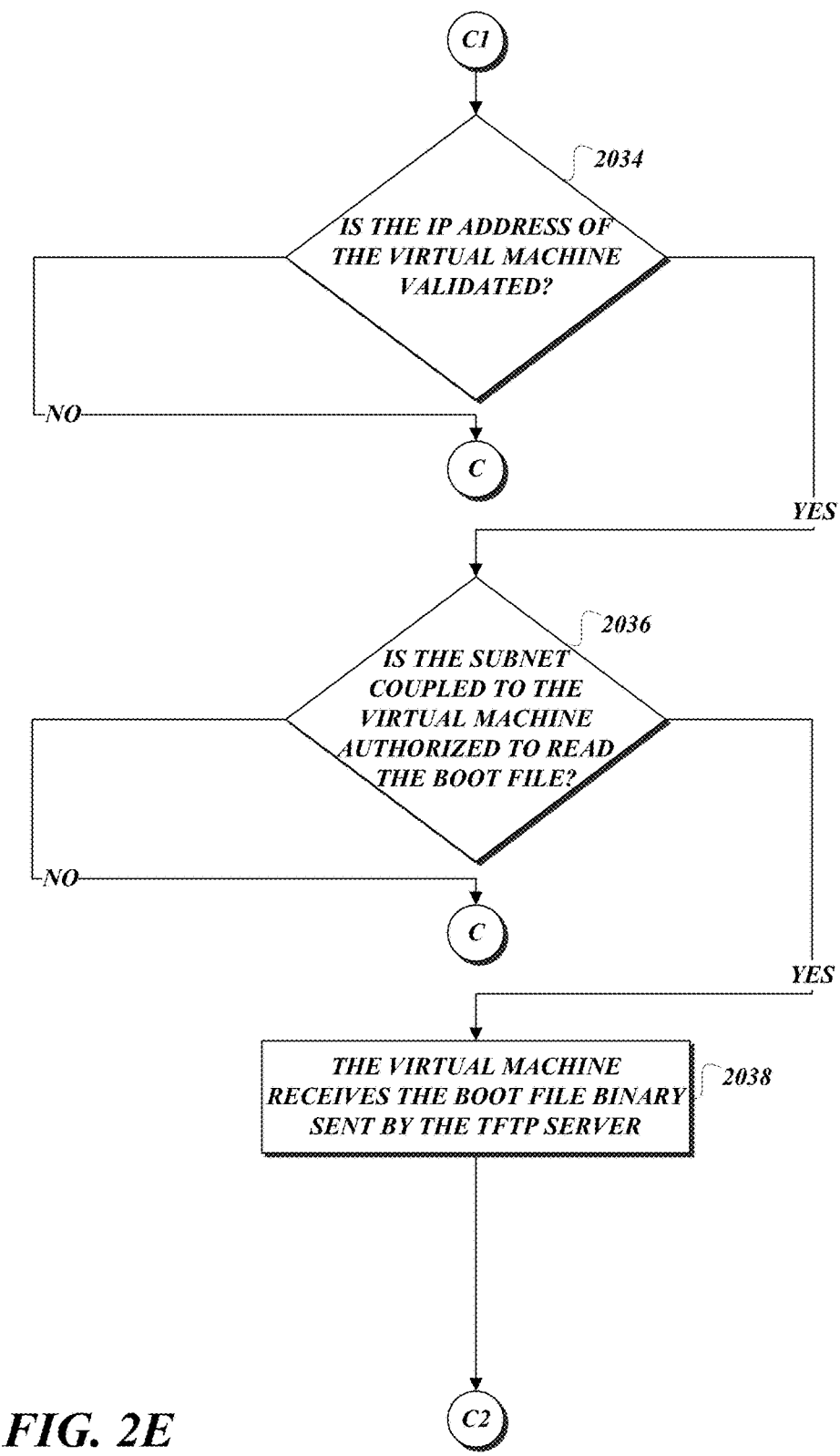
Figure 2F:
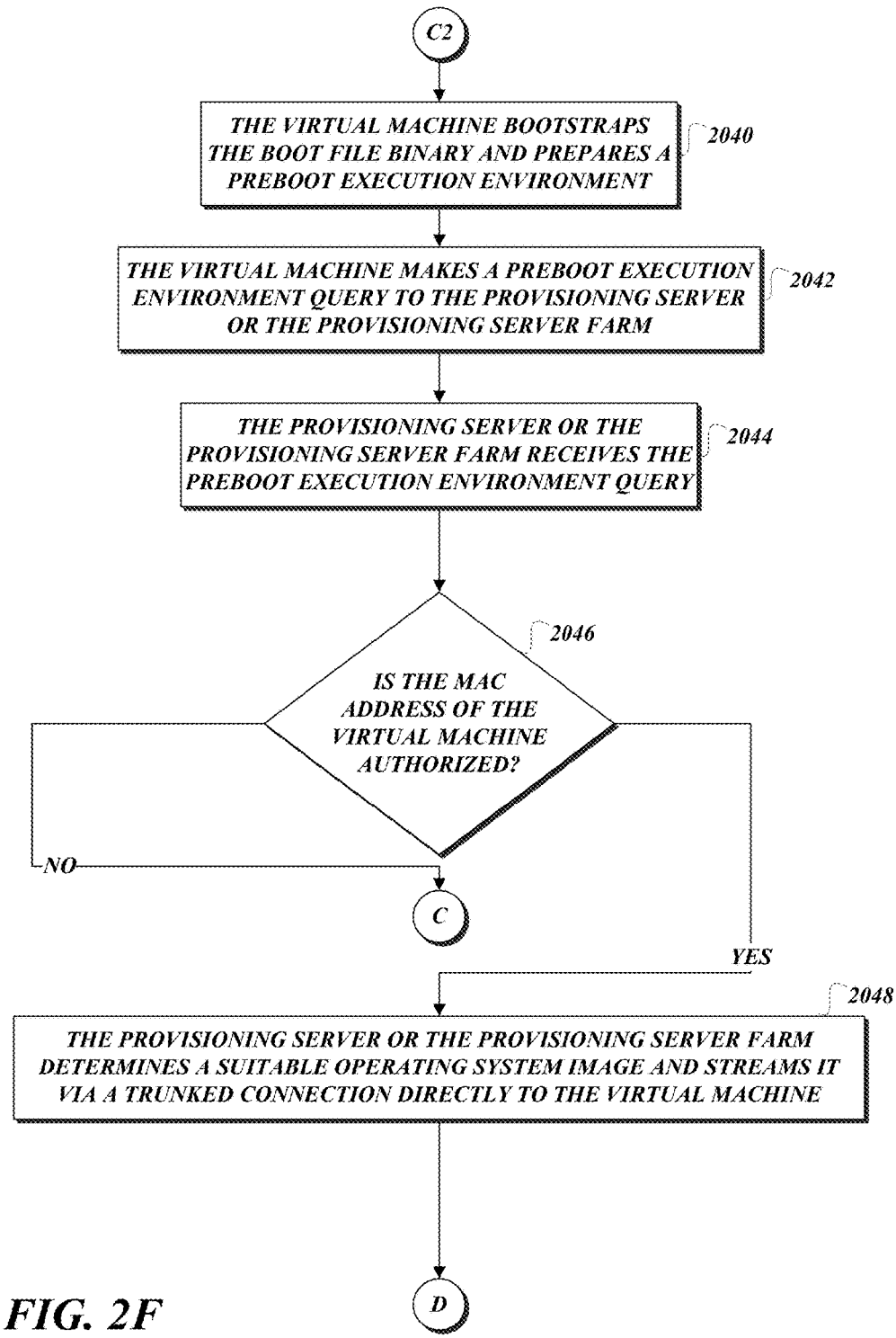

FIG. 1 illustrates a system 100, which is suitable for delivering pieces of software to virtual machines on different subnetworks, such as three or five or any number of subnetworks. A virtual machine is a piece of software forming a fictional computer. The virtual machine provides a complete system platform whose virtual computing machineries support the execution of a complete operating system. The virtual machine usually emulates an existing CPU architecture. The network of the system 100 suitably supports VLAN tagging. VLAN tagging is the networking standard that supports Virtual LANs (VLANs) on an Ethernet network. The standard defines a system of VLAN tagging for Ethernet frames and the accompanying procedures to be used by switches in handling such frames.

As an example, a provisioning server 102 is capable of delivering an operating system (e.g. Microsoft Windows 7) to more than one subnetwork. In the system 100, three separate subnetworks are supported by one provisioning server 102 (but may consist of a provisioning server farm comprising two or more servers). Since one provisioning server 102 can be used for multiple subnetworks, this reduces the need to build, license, and support a provisioning server 102 or a provisioning server farm for each subnetwork. In the system 100 only one provisioning server 102 is required, which eliminates additional Windows and required Infrastructure Software licensing; reduces additional effort to implement and maintain more provisioning servers; increases flexibility to add additional subnetworks; and scales a provisioning server farm to meet demand by adding servers. Virtual capacity can be designated for each subnetwork if needed to provide additional segmentation to meet standard build unit's requirements.

The system 100 includes one provisioning server 102 which is networked to a number of virtual machines 104A-104C residing on different standard build units. Instead of using the provisioning server 102, a provisioning server farm may be used. On the provisioning server 102, one single operating system image is stored in Virtual Hard Disk (VHD) format, which facilitates the storage of multiple operating systems. The provisioning server 102 is configured with a network interface, such as a port or network interface controller. This network interface is a system of software/hardware suitable for interfacing between two pieces of equipment, such as the provisioning server 102 and the virtual machines 104A-104C. The network interface facilitates management traffic and provides networking functions such as passing messages, connecting and disconnecting, and so on. The provisioning server 102 is also configured with one or more network adapters to which trunked connections supporting at least 10-gigabit Ethernet connect the provisioning server 102 to a number of virtual machines 104A-104C. The network adapters (not shown) are suitably configured for IEEE 802.1q networking standard.

The virtual machines 104A-104C are networked to a virtual firewall 108 vis-à-vis virtual LAN (VLAN) 106A-106C, respectively. The provisioning server 102 also is coupled to the virtual firewall 108 via VLAN 106D. The virtual firewall 108 provides network segmentation by splitting the system 100 into subnetworks accessible by VLAN 106A-106D. Advantages of such splitting are primarily for boosting performance (via reduced congestion) and improving security, as well as containing network problems.

The virtual firewall 108 is networked to a physical firewall 110. The physical firewall 110 is networked to a LAN switch 112 or a LAN router. The LAN switch 112 is a telecommunication device that receives a message from any device connected to it and then transmits the message only to the device for which the message was meant. In one embodiment, the LAN switch 112 is a network switch having ports to which the VLAN 106A-106D are trunked.

The LAN switch 112 is networked to a DHCP server 114 and a TFTP server 116. The DHCP server 114 is used by the system 100 on an IP network to allocate IP addresses to computers. The purpose of the DHCP server 114 is to automate the IP address configuration of a computer connected to a network without a network administrator having to manually configure it. The TFTP server 116 stores a boot file, which is a binary file, containing files necessary for the booting of an operating system on a virtual machine. The boot file supports a suitable trivial file transfer protocol which below implements a user datagram protocol for transport of binary files. The boot file also contains the IP address of the provisioning server 102's network interface so as to facilitate communication to allow a virtual machine network to boot from the provisioning server 102.

FIGS. 2A-2F are process diagrams implementing a method 2000 for streaming operating systems to virtual machines on multiple subnets. From a start block, the method 2000 proceeds to a set of method steps 2002 defined between a continuation terminal ("terminal A") and another continuation terminal ("terminal B"). The set of method steps 2002 execute steps suitable for preparing the network for streaming operating systems to virtual machines on multiple subnets.

From terminal A (FIG. 2B), the method proceeds to block 2010, where the method provides a provisioning server or provisioning server farm. At block 2012, the method provides one or more end stations, such as standard build units. At block 2014, the method provides a joint connection from the provisioning server or the provisioning server farm to each end station. At block 2016, the method provides a virtual firewall with routing capabilities supporting the VLAN tagging. At block 2018, the method provides a virtual machine suitable for presentation on an end station. At block 2020, the method provides VLAN subnetworks, each coupling the virtual firewall with a virtual machine. At block 2022, the method provides another VLAN subnetwork, coupling the virtual firewall to the provisioning server or the provisioning server farm. The method then continues to another continuation terminal ("terminal A1").

From terminal A1 (FIG. 2C), the method proceeds to block 2024, where the method provides a physical firewall. At block 2026, the method networks the physical firewall to the virtual firewall. At block 2028, the method provides a LAN switch coupled to the physical firewall. At block 2030, the method provides a DHCP server coupled to the LAN switch. At block 2032, the method provides a TFTP server coupled to the LAN switch. The method then continues to terminal B.

From terminal B (FIG. 2A), the method proceeds to a set of method steps 2004 defined between a continuation terminal ("terminal C") and another continuation terminal ("terminal D"). The set of method steps 2004 prepares virtual machines on virtual desktops to receive streamed operating systems. From terminal C (FIG. 2D), the method proceeds to block 2050, where a virtual machine makes a DHCP query and a proxy DHCP query. At block 2052, the DHCP query and the proxy DHCP query propagate through the VLAN subnetwork using user datagram protocol 69. At block 2054, the network routes the DHCP query and the proxy DHCP query to the DHCP server. At block 2056, the DHCP server, in response, provides the IP address of the TFTP server and the name of a boot file. At block 2058, the virtual machine receives the IP address of the TFTP server and the name of the boot file. At block 2060, the virtual machine uses the IP address of the TFTP server and queries the boot file binary using the name of the boot file. At block 2062, the TFTP server receives the query and attempts to validate the IP address of the virtual machine that queried. The method then continues to another continuation terminal ("terminal C1").

From terminal C1 (FIG. 2E), the method proceeds to decision block 2034 where a test is performed to determine whether the IP address of the virtual machine is validated. If the answer is NO to the test at decision block 2034, the method proceeds to terminal C and skips back to previously described steps. If the answer to the test at decision block 2034 is YES, the method proceeds to another decision block at 2036 where another test is performed to determine whether the subnet coupled to the virtual machine is authorized to read the boot file. If the answer to the test at decision block 2036 is NO, the method proceeds to terminal C and skips back to previously described steps. If the answer to the test at decision block 2036 is YES, the method proceeds to block 2038, where the virtual machine receives the boot file binary sent by the TFTP server. The method then continues to another continuation terminal ("terminal C2").

From terminal C2 (FIG. 2F), the method proceeds to block 2040, where the virtual machine bootstraps the boot file binary and prepares a preboot execution environment. At block 2042, the virtual machine makes a preboot execution environment query to the provisioning server or the provisioning server farm. At block 2044, the provisioning server or the provisioning server farm receives the preboot execution environment query. At decision block 2046, a test is performed to determine whether the MAC address of the virtual machine is authorized. If the answer to the test at decision block 2046 is NO, the method proceeds to terminal C and skips to previously described processing steps. Otherwise, if the answer to the test at decision block 2046 is YES, the method proceeds to block 2048, where the provisioning server or the provisioning server farm determines a suitable operating system image and streams it via a trunked connection directly to the virtual machine. The method then continues to terminal D.

From terminal D (FIG. 2A), the method 2000 proceeds to a set of method steps 2006 defined between a continuation terminal ("terminal E") and another continuation terminal ("terminal F"). The set of method steps 2006 completes the operating system boot process on the virtual machines. The method then terminates execution.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system comprising:
   a TFTP server;
   a provisioning server or a provisioning server farm;
   multiple virtual machines running on standard build units networked to the provisioning server or the provisioning server farm without a firewall interposing between the multiple virtual machines and the provisioning server or the provisioning server farm; and
   multiple virtual local area network subnetworks networking the multiple virtual machines running on the standard build units to the TFTP server.

2. The system of claim 1, further comprising a virtual firewall which is networked to the multiple virtual local area network subnetworks including the provisioning server or the provisioning server farm.

3. The system of claim 2, further comprising a physical firewall networked to the virtual firewall.

4. The system of claim 3, further comprising a LAN switch coupled to the physical firewall.

5. The system of claim 4, further comprising a DHCP server coupled to the LAN switch.

6. The system of claim 5, further comprising a TFTP server coupled to the LAN switch.

7. A method comprising:
   receiving by a virtual machine a boot file from a TFTP server on a subnetwork;
   identifying an IP address of a provisioning server farm;
   making a pre-execution environment request to the provisioning server farm on a network different from the subnetwork that directly couples the virtual machine to the provisioning server farm; and
   streaming an operating system image to the virtual machine by the provisioning server farm on the network different from the subnetwork that directly couples the virtual machine to the provisioning server farm after which the virtual machine completes an operating system boot process.

8. The method of claim 7, further comprising bootstrapping the boot file by the virtual machine.

9. The method of claim 7, further comprising requesting by the virtual machine a DHCP request and a Proxy DHCP request.

10. The method of claim 9, further comprising receiving the DHCP request and the Proxy DHCP request by the DHCP server, and in response, providing the IP address of the TFTP server and the name of the boot file.

11. The method of claim 10, further comprising making a TFTP request to the TFTP server by the virtual machine for the boot file.

12. The method of claim 11, further comprising validating the TFTP request by the TFTP server to determine whether the IP address of the virtual machine is permitted to make the TFTP request, and providing the boot file if the subnetwork is authorized to read the boot file.

13. The method of claim 12, further comprising validating the pre-execution environment request by determining whether a MAC address of the virtual machine is authorized and further determining the operating system image to stream.

14. A non-transitory computer-readable medium on which computer-executable instructions are stored to implement a method comprising:
   receiving by a virtual machine a boot file from a TFTP server on a subnetwork;
   identifying an IP address of a provisioning server farm;
   making a pre-execution environment request to the provisioning server farm on a network different from the subnetwork that directly couples the virtual machine to the provisioning server farm; and
   streaming an operating system image to the virtual machine by the provisioning server farm on the network different from the subnetwork that directly couples the virtual machine to the provisioning server farm after which the virtual machine completes an operating system boot process.

15. The computer-readable medium of claim 14, further comprising bootstrapping the boot file by the virtual machine.

16. The computer-readable medium of claim 14, further comprising requesting by the virtual machine a DHCP request and a Proxy DHCP request.

17. The computer-readable medium of claim 16, further comprising receiving the DHCP request and the Proxy DHCP request by the DHCP server, and in response, providing the IP address of the TFTP server and the name of the boot file.

18. The computer-readable medium of claim 17, further comprising making a TFTP request to the TFTP server by the virtual machine for the boot file.

19. The computer-readable medium of claim 18, further comprising validating the TFTP request by the TFTP server to determine whether the IP address of the virtual machine is permitted to make the TFTP request, and providing the boot file if the subnetwork is authorized to read the boot file.

20. The computer-readable medium of claim 19, further comprising validating the pre-execution environment request by determining whether a MAC address of the virtual machine is authorized and further determining the operating system image to stream.

* * * * *